US011122121B2

(12) United States Patent
Guyer et al.

(10) Patent No.: US 11,122,121 B2
(45) Date of Patent: *Sep. 14, 2021

(54) STORAGE SYSTEM HAVING STORAGE ENGINES WITH MULTI-INITIATOR HOST ADAPTER AND FABRIC CHAINING

(71) Applicant: EMC IP HOLDING COMPANY LLC, Hopkinton, MA (US)

(72) Inventors: James Guyer, Northboro, MA (US); Alesia Tringale, Worcester, MA (US); Jason Duquette, Milford, MA (US); William Baxter, Holliston, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/691,814

(22) Filed: Nov. 22, 2019

(65) Prior Publication Data

US 2021/0160316 A1    May 27, 2021

(51) Int. Cl.
*H04L 29/08* (2006.01)
*H04L 12/933* (2013.01)
*G06F 3/06* (2006.01)

(52) U.S. Cl.
CPC ........ *H04L 67/1097* (2013.01); *G06F 3/0604* (2013.01); *G06F 3/067* (2013.01); *H04L 49/15* (2013.01)

(58) Field of Classification Search
None
See application file for complete search history.

(56) References Cited

U.S. PATENT DOCUMENTS

| 7,594,083 | B2 * | 9/2009 | Kurokawa | G06F 3/0607 |
| | | | | 711/111 |
| 7,720,377 | B2 * | 5/2010 | Snider | H04B 10/801 |
| | | | | 398/45 |
| 9,910,753 | B1 * | 3/2018 | Tringale | G06F 11/2007 |
| 10,277,677 | B2 * | 4/2019 | Nachimuthu | G06F 12/00 |
| 10,320,710 | B2 * | 6/2019 | Guim Bernat | G06F 13/28 |
| 2012/0185643 | A1 * | 7/2012 | DeKoning | G06F 3/067 |
| | | | | 711/114 |
| 2015/0006949 | A1 * | 1/2015 | Bittles | G06F 11/2023 |
| | | | | 714/4.11 |

(Continued)

*Primary Examiner* — Lashonda T Jacobs
(74) *Attorney, Agent, or Firm* — Anderson Gorecki LLP

(57) ABSTRACT

A storage system includes four storage engines, each storage engine including two compute nodes. Eight point-to-point connections are used to interconnect pairs of compute nodes on different storage engines, such that each compute node is connected to exactly two other compute nodes of the storage system. Atomic operations can be initiated by any compute node on any other compute node. Atomic operations received by a compute node on one of the point-to-point connections will be forwarded on the other point-to-point connection if the atomic operation is not directed to the compute node. During normal operation, atomic operations on a given compute node are performed on a host adapter associated with the compute node. Upon failure of the host adapter associated with the compute node, atomic operations may be performed on the compute node using the host adapter of the other compute node of the storage engine.

11 Claims, 17 Drawing Sheets

(56) References Cited

U.S. PATENT DOCUMENTS

| | | | |
|---|---|---|---|
| 2015/0134780 A1* | 5/2015 | Weber | G06F 16/17 |
| | | | 709/219 |
| 2017/0255590 A1* | 9/2017 | Shuler | G06F 9/526 |
| 2018/0181324 A1* | 6/2018 | Danilov | G06F 3/0631 |
| 2018/0225179 A1* | 8/2018 | Donaghy | G06F 11/1448 |
| 2019/0332529 A1* | 10/2019 | Byrne | G06F 12/0284 |
| 2020/0334177 A1* | 10/2020 | Wigmore | G06F 13/4022 |

* cited by examiner

STORAGE SYSTEM HAVING STORAGE ENGINES WITH MULTI-INITIATOR HOST ADAPTER AND FABRIC CHAINING

BACKGROUND

This disclosure relates to computing systems and related devices and methods, and, more particularly, to a storage system having storage engines with multi-initiator host adapters and fabric chaining.

SUMMARY

The following Summary and the Abstract set forth at the end of this application are provided herein to introduce some concepts discussed in the Detailed Description below. The Summary and Abstract sections are not comprehensive and are not intended to delineate the scope of protectable subject matter, which is set forth by the claims presented below.

All examples and features mentioned below can be combined in any technically possible way.

In some embodiments, a storage system includes four storage engines, each storage engine including two compute nodes. Eight point-to-point connections are used to interconnect pairs of compute nodes on different storage engines, such that each compute node is connected to exactly two other compute nodes of the storage system. Atomic operations can be initiated by any compute node on any other compute node. Atomic operations received by a compute node on one of the point-to-point connections will be forwarded on the other point-to-point connection if the atomic operation is not directed to the compute node. During normal operation, atomic operations on a given compute node are performed on a host adapter associated with the compute node. Upon failure of the host adapter associated with the compute node, atomic operations may be performed on the compute node using the host adapter of the other compute node of the storage engine.

DETAILED DESCRIPTION

Aspects of the inventive concepts will be described as being implemented in a storage system 100 connected to a host computer 102. Such implementations should not be viewed as limiting. Those of ordinary skill in the art will recognize that there are a wide variety of implementations of the inventive concepts in view of the teachings of the present disclosure.

Some aspects, features and implementations described herein may include machines such as computers, electronic components, optical components, and processes such as computer-implemented procedures and steps. It will be apparent to those of ordinary skill in the art that the computer-implemented procedures and steps may be stored as computer-executable instructions on a non-transitory tangible computer-readable medium. Furthermore, it will be understood by those of ordinary skill in the art that the computer-executable instructions may be executed on a variety of tangible processor devices, i.e., physical hardware. For ease of exposition, not every step, device or component that may be part of a computer or data storage system is described herein. Those of ordinary skill in the art will recognize such steps, devices and components in view of the teachings of the present disclosure and the knowledge generally available to those of ordinary skill in the art. The corresponding machines and processes are therefore enabled and within the scope of the disclosure.

The terminology used in this disclosure is intended to be interpreted broadly within the limits of subject matter eligibility. The terms "logical" and "virtual" are used to refer to features that are abstractions of other features, e.g. and without limitation, abstractions of tangible features. The term "physical" is used to refer to tangible features, including but not limited to electronic hardware. For example, multiple virtual computing devices could operate simultaneously on one physical computing device. The term "logic" is used to refer to special purpose physical circuit elements, firmware, software, computer instructions that are stored on a non-transitory tangible computer-readable medium and implemented by multi-purpose tangible processors, and any combinations thereof.

Figure 1:
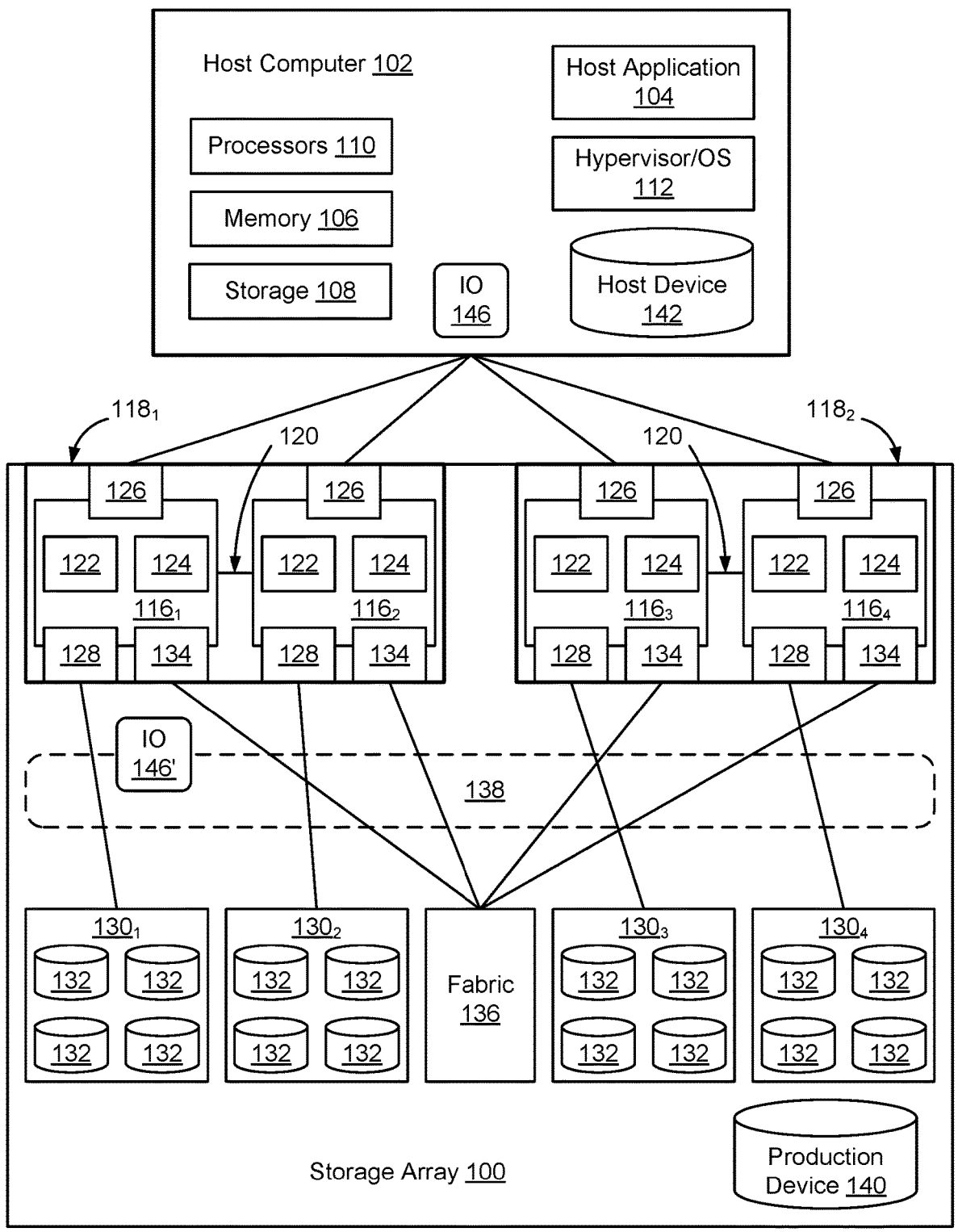
FIG. 1 is a functional block diagram of an example storage system connected to a host computer, according to some embodiments.

FIG. 1 illustrates a storage system 100 and an associated host computer 102, of which there may be many. The storage system 100 provides data storage services for a host application 104, of which there may be more than one instance and type running on the host computer 102. In the illustrated example the host computer 102 is a server with volatile memory 106, persistent storage 108, one or more tangible processors 110, and a hypervisor or OS (operating system) 112. The processors 110 may include one or more multi-core processors that include multiple CPUs, GPUs, and combinations thereof. The volatile memory 106 may include RAM (Random Access Memory) of any type. The persistent storage 108 may include tangible persistent storage components of one or more technology types, for example and without limitation Solid State Drives (SSDs) and Hard Disk Drives (HDDs) of any type, including but not limited to SCM (Storage Class Memory), EFDs (enterprise flash drives), SATA (Serial Advanced Technology Attachment) drives, and FC (Fibre Channel) drives. The host computer 102 might support multiple virtual hosts running on virtual machines or containers, and although an external host computer 102 is illustrated, in some embodiments host computer 102 may be instantiated in a virtual machine within storage system 100.

The storage system 100 includes a plurality of compute nodes $116_1$-$116_4$, possibly including but not limited to storage servers and specially designed compute engines or storage directors for providing data storage services. In some embodiments, pairs of the compute nodes, e.g. ($116_1$-$116_2$) and ($116_3$-$116_4$), are organized as storage engines $118_1$ and $118_2$, respectively, for purposes of facilitating failover between compute nodes 116. In some embodiments, the paired compute nodes 116 of each storage engine 118 are directly interconnected by communication links 120. As used herein, the term "storage engine" will refer to a storage engine, such as storage engines $118_1$ and $118_2$, which has a pair of (two independent) compute nodes, e.g. ($116_1$-$116_2$) or ($116_3$-$116_4$). A given storage engine 118 is implemented using a single physical enclosure and provides a logical separation between itself and other storage engines 118 of the storage system 100. A given storage system 100 may include one or multiple storage engines 118.

Each compute node, $116_1$, $116_2$, $116_3$, $116_4$, includes processors 122 and a local volatile memory 124. The processors 122 may include a plurality of multi-core processors of one or more types, e.g. including multiple CPUs, GPUs, and combinations thereof. The local volatile memory 124 may include, for example and without limitation, any type of RAM. Each compute node 116 may also include one or more FEs (front end adapters) 126 for communicating with the host computer 102. Each compute node $116_1$-$116_4$ may also include one or more BEs (back end adapters) 128 for communicating with respective associated back end drive arrays $130_1$-$130_4$, thereby enabling access to managed drives 132.

In some embodiments, managed drives 132 are storage resources dedicated to providing data storage to storage system 100 or are shared between a set of storage systems 100. Managed drives 132 may be implemented using numerous types of memory technologies for example and without limitation any of the SSDs and HDDs mentioned above. In some embodiments the managed drives 132 are implemented using Non-Volatile Memory (NVM) media technologies, such as NAND-based flash, or higher-performing Storage Class Memory (SCM) media technologies such as 3D XPoint and Resistive RAM (ReRAM). Managed drives 132 may be directly connected to the compute nodes $116_1$-$116_4$, using a PCIe bus or may be connected to the compute nodes $116_1$-$116_4$, for example, by an InfiniBand (IB) bus or fabric.

In some embodiments, each compute node 116 also includes one or more CAs (channel adapters) 134 for communicating with other compute nodes 116. The interconnection between compute nodes may be direct, for example using an InfiniBand bus, or may be implemented using a fabric 136. An example interconnecting fabric may be implemented using InfiniBand. Each compute node 116 may allocate a portion or partition of its respective local volatile memory 124 to a virtual shared "global" memory 138 that can be accessed by other compute nodes 116, e.g. via Direct Memory Access (DMA) or Remote Direct Memory Access (RDMA).

The storage system 100 maintains data for the host applications 104 running on the host computer 102. For example, host application 104 may write host application data to the storage system 100 and read host application data from the storage system 100 in order to perform various functions. Examples of host applications 104 may include but are not limited to file servers, email servers, block servers, and databases. Logical storage devices are created and presented to the host application 104 for storage of the host application data. For example, in some embodiments, a production device 140 and a corresponding host device 142 are created to enable the storage system 100 to provide storage services to the host application 104.

The host device 142 is a local (to host computer 102) representation of the production device 140. Multiple host devices 142 associated with different host computers 102 may be local representations of the same production device 140. The host device 142 and the production device 140 are abstraction layers between the managed drives 132 and the host application 104. From the perspective of the host application 104, the host device 142 is a single data storage device having a set of contiguous fixed-size LBAs (logical block addresses) on which data used by the host application 104 resides and can be stored. However, the data used by the host application 104 and the storage resources available for use by the host application 104 may actually be maintained by the compute nodes $116_1$-$116_4$ at non-contiguous addresses on various different managed drives 132 on storage system 100.

In some embodiments, the storage system 100 maintains metadata that indicates, among various things, mappings between the production device 140 and the locations of extents of host application data in the shared global memory 138 and the managed drives 132. In response to an IO (input/output command) 146 from the host application 104 to the host device 142, the hypervisor/OS 112 determines whether the IO 146 can be serviced by accessing the host computer memory 106. If that is not possible then the IO 146 is sent to one of the compute nodes 116 to be serviced by the storage system 100.

There may be multiple paths between the host computer 102 and the storage system 100, e.g. one path per front end adapter 126. The paths may be selected based on a wide variety of techniques and algorithms including, for context and without limitation, performance and load balancing. In the case where IO 146 is a read command, the storage system 100 uses metadata to locate the commanded data, e.g. in the shared global memory 138 or on managed drives 132. If the commanded data is not in the shared global memory 138, then the data is temporarily copied into the shared global memory 138 from the managed drives 132, and sent to the host application 104 via one of the compute nodes $116_1$-$116_4$. In the case where the IO 146 is a write command, in some embodiments the storage system 100 copies a block being written into the shared global memory 138, marks the data as dirty, and creates new metadata that maps the address of the data on the production device 140 to a location to which the block is written on the managed drives 132. The shared global memory 138 may enable the production device 140 to be reachable via all of the compute nodes $116_1$-$116_4$ and paths, although the storage system 100 can be configured to limit use of certain paths to certain production devices 140.

Figure 2:
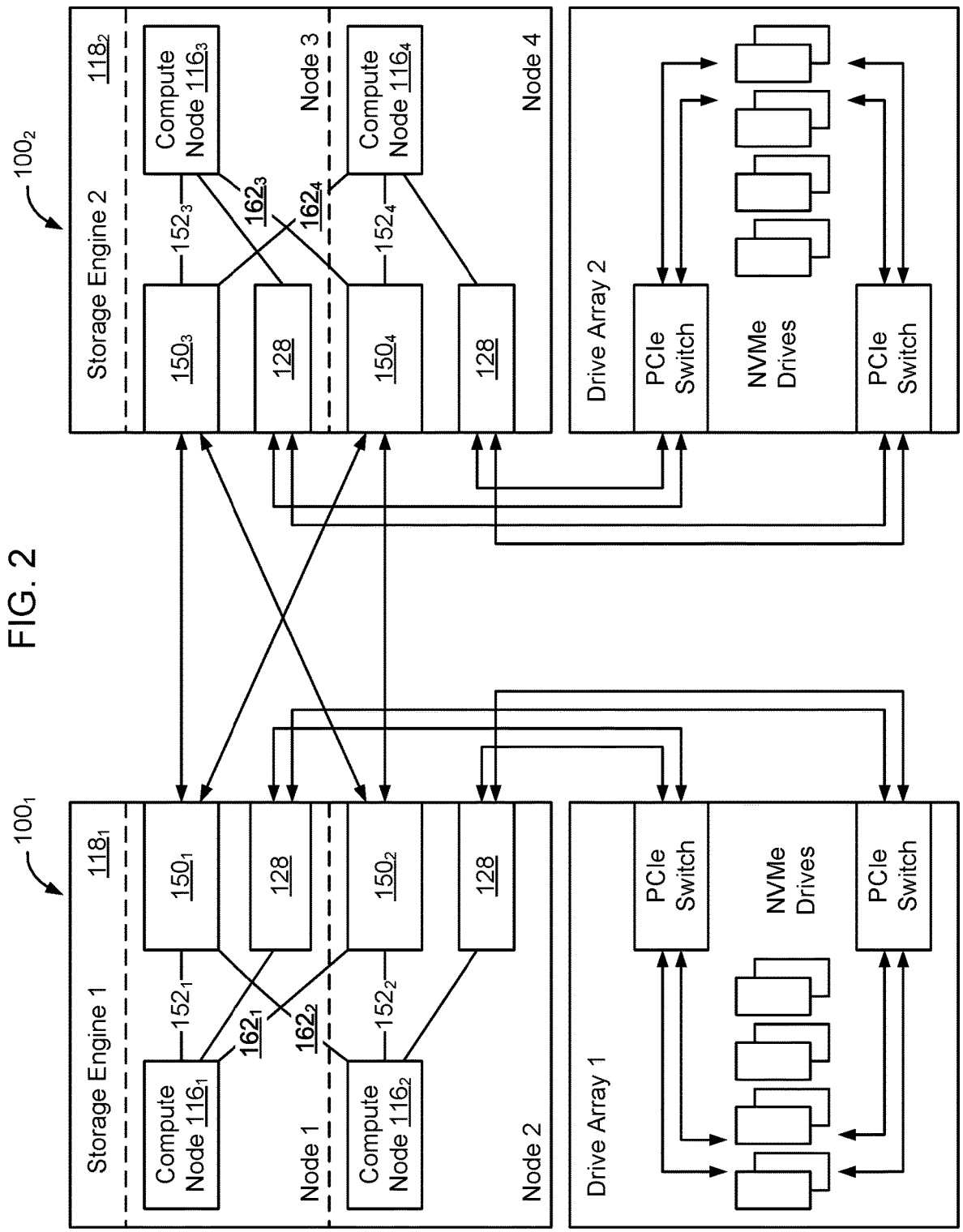
FIG. 2 is a functional block diagram of a storage system including two interconnected storage engines, each storage engine with a pair of compute nodes, in which each of the compute nodes in each of the storage engines multi-initiator host adapters and fabric chaining, according to some embodiments.

FIG. 2 is a functional block diagram of a storage system 100 having a first storage engine $118_1$ interconnected with a second storage engine $118_2$, according to some embodiments. As shown in FIG. 2, in some embodiments each storage engine 118 has dual compute nodes 116, and each of the dual compute nodes 116 has redundant fabric access. For example, as shown in FIG. 2, compute node $116_1$ includes a host adapter $150_1$, and is connected by PCIe bus $152_1$ to host adapter $150_1$. Additionally, compute node $116_1$ is connected by PCIe bus $162_1$ to the host adapter $150_2$ of the other compute node $116_2$. Compute node $116_2$ includes a host adapter $150_2$, and is connected by PCIe bus $152_2$ to host adapter $150_2$. Additionally, compute node $116_2$ is connected by PCIe bus $162_2$ to the host adapter $150_1$ of the other compute node $116_1$.

Similar connections $152_3$, $152_4$, $162_3$, $162_4$, are implemented in the second storage engine $118_2$ between compute node $116_3$ and host adapters $150_3$ and $150_4$, and between compute node $116_4$ and host adapters $150_3$ and $150_4$.

Figure 3:
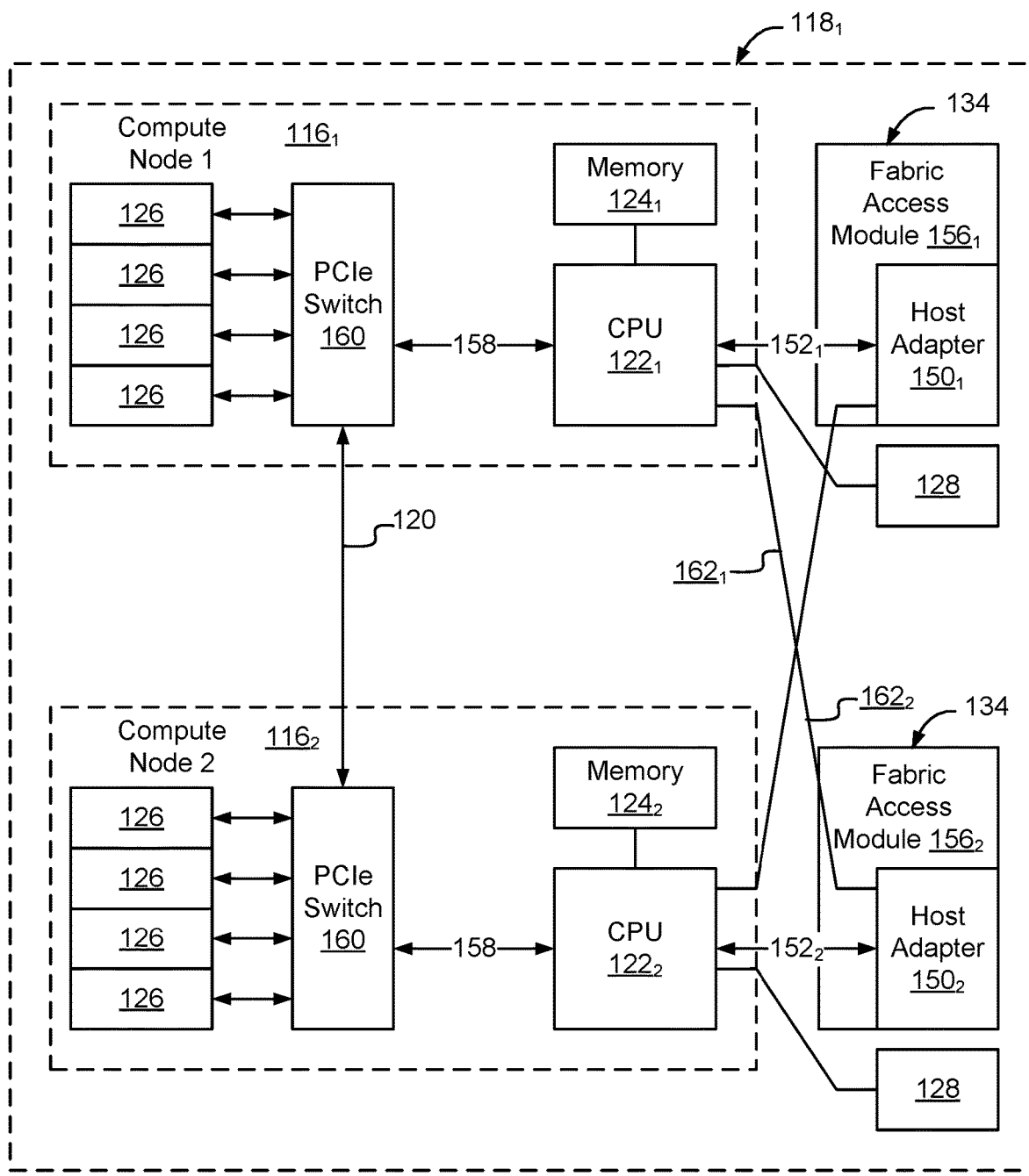
FIG. 3 is a functional block diagram of one of the storage engines of FIG. 2 in greater detail, according to some embodiments.

FIG. 3 is a functional block diagram of one of the storage engines $118_1$ of FIG. 2 showing the architecture of the storage engine $118_1$ in greater detail. As shown in FIG. 3, in some embodiments, each compute node 116 includes a CPU 122 and a set of front-end adapters 126. The CPU 122 and front-end adapters 126 may be interconnected, for example, using a PCIe switch 160. Local volatile memory 124 is connected to CPU 122. The CPU $122_1$ of compute node $116_1$ has a first connection $152_1$ to an associated fabric access module $156_1$ which includes host adapter $150_1$. Connection $152_1$, in some embodiments, is implemented using a PCIe bus. The CPU $122_1$ of compute node $116_1$ also has a second connection $162_1$ to a fabric access module $156_2$, which includes host adapter $150_2$, that is associated with compute node $116_2$. Connection $162_1$, in some embodiments, is implemented using a PCIe bus. By connecting both the host adapter $150_1$ associated with compute node $116_1$ and the host adapter $150_2$ associated with compute node $116_2$ to the PCIe root complex of compute node $116_1$, compute node $116_1$ is able to issue memory operations through either host adapter $150_1$, $150_2$.

Compute node $116_2$ is similarly configured such that CPU $122_2$ of compute node $116_2$ has a first connection $152_2$ to an associated fabric access module $156_2$ which includes host adapter $150_2$. Connection $152_2$, in some embodiments, is implemented using a PCIe bus. The CPU $122_2$ of compute node $116_2$ also has a second connection $162_2$ to a fabric access module $156_1$, which includes host adapter $150_1$, that is associated with compute node $116_1$. Connection $162_2$, in some embodiments, is implemented using a PCIe bus. By connecting both the host adapter $150_2$ associated with compute node $116_2$ and the host adapter $150_1$ associated with compute node $116_1$ to the PCIe root complex of compute node $116_1$, compute node $116_2$ is able to issue memory operations through either host adapter $150_2$, $150_1$.

Figure 4:
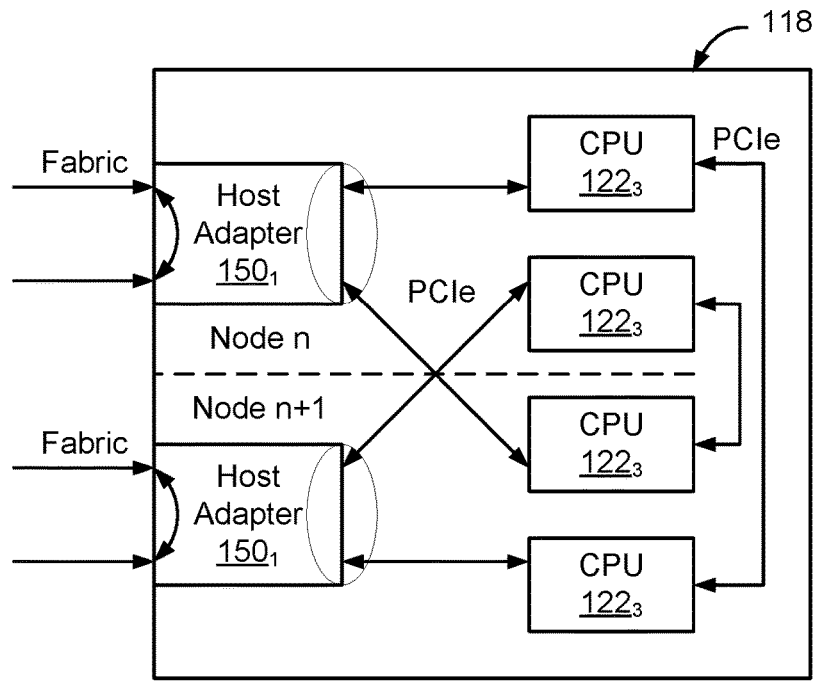
FIG. 4 is a functional block diagram of the storage engine of FIG. 3, according to some embodiments.

As shown in FIG. 4, in some embodiments each host adapter is connected to two point-to-point links to enable each of the compute nodes 116 to be connected to two other compute nodes 116 of the storage system 100.

Figure 5:
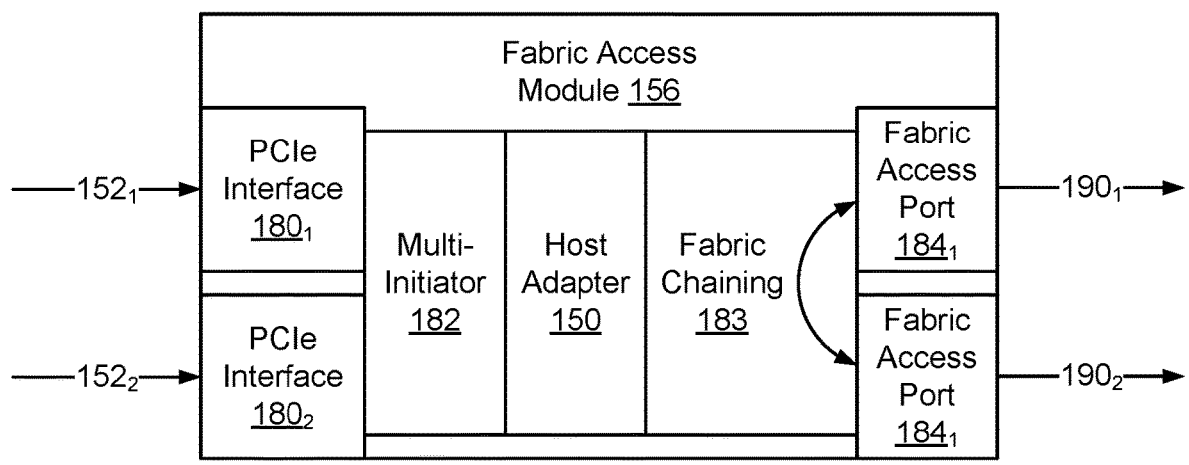
FIG. 5 is a functional block diagram showing additional details of an example fabric access module of the compute node of FIG. 3, according to some embodiments.

FIG. 5 is a functional block diagram of an example fabric access module 156 according to some embodiments. As shown in FIG. 5, in some embodiments the fabric access module 156 includes a first PCIe interface $180_1$, a second PCIe interface $180_2$, a multi-initiator module 182, and host adapter 150. In some embodiments the multi-initiator module 182 is configured to enable multi-initiating, such that multiple CPUs can initiate atomic operations on the host adapter 150 via multi-initiator module 182. The host adapter 150, in some embodiments, is configured to enable both compute nodes to initiate atomic operations on any connected memory 124. For example, referring to FIG. 3, compute node $116_1$ can initiate an atomic operation on its own memory $124_1$ using host adapter $150_1$, or can initiate an atomic operation on its own memory $124_1$ using host adapter $150_2$. Likewise, compute node $116_2$ can initiate an atomic operation on its own memory $124_2$ using host adapter $150_2$, or can initiate an atomic operation on its own memory $124_2$ using host adapter $150_1$. By enabling each host adapter 150 to be multi-initiating, it becomes possible for each compute node $116_1$, $116_2$, to natively perform memory access operations on each memory $124_1$, $124_2$ of storage engine 118. In particular, memory access operations by one of the nodes on the memory of the other node do not require the other compute node 116 to become involved in the memory access operation, thus greatly simplifying the memory access operation and improving the efficiency of the storage engine 118 and reducing latency in accessing data.

As shown in FIG. 5, in some embodiments the fabric access module 156 includes a fabric chaining module 183 configured to enable operations initiated by other compute nodes 116 to be forwarded through the fabric access module 156 to another storage engine 118. In some embodiments, each fabric chaining module 183 has two external fabric access ports 184 to enable the fabric chaining module 183 to be connected by point to point links to two other fabric access modules 156. In some embodiments, the connections between the fabric access modules 156 (as discussed below) are implemented using point-to-point links. By configuring the fabric chaining module 183 to include two fabric access ports $184_1$, $184_2$, and configuring the fabric chaining module 183 to enable an operation received on a first of the fabric access ports $184_1$ to be forwarded out the second of the fabric access ports $184_2$, it is possible to enable operations such as memory access operations or atomic operations to be redirected between storage engines 118 without requiring the storage engines 118 to be interconnected using an external switch. In some embodiments, not needing to use an external switch to interconnect a set of storage engines can greatly simplify the architecture of the storage system and result in significant cost and power savings.

In some embodiments, if an atomic operation is received on one of the fabric access ports and is not intended to execute on a memory associated with the respective compute node, the atomic operation is forwarded on the other fabric access port.

Figure 6:
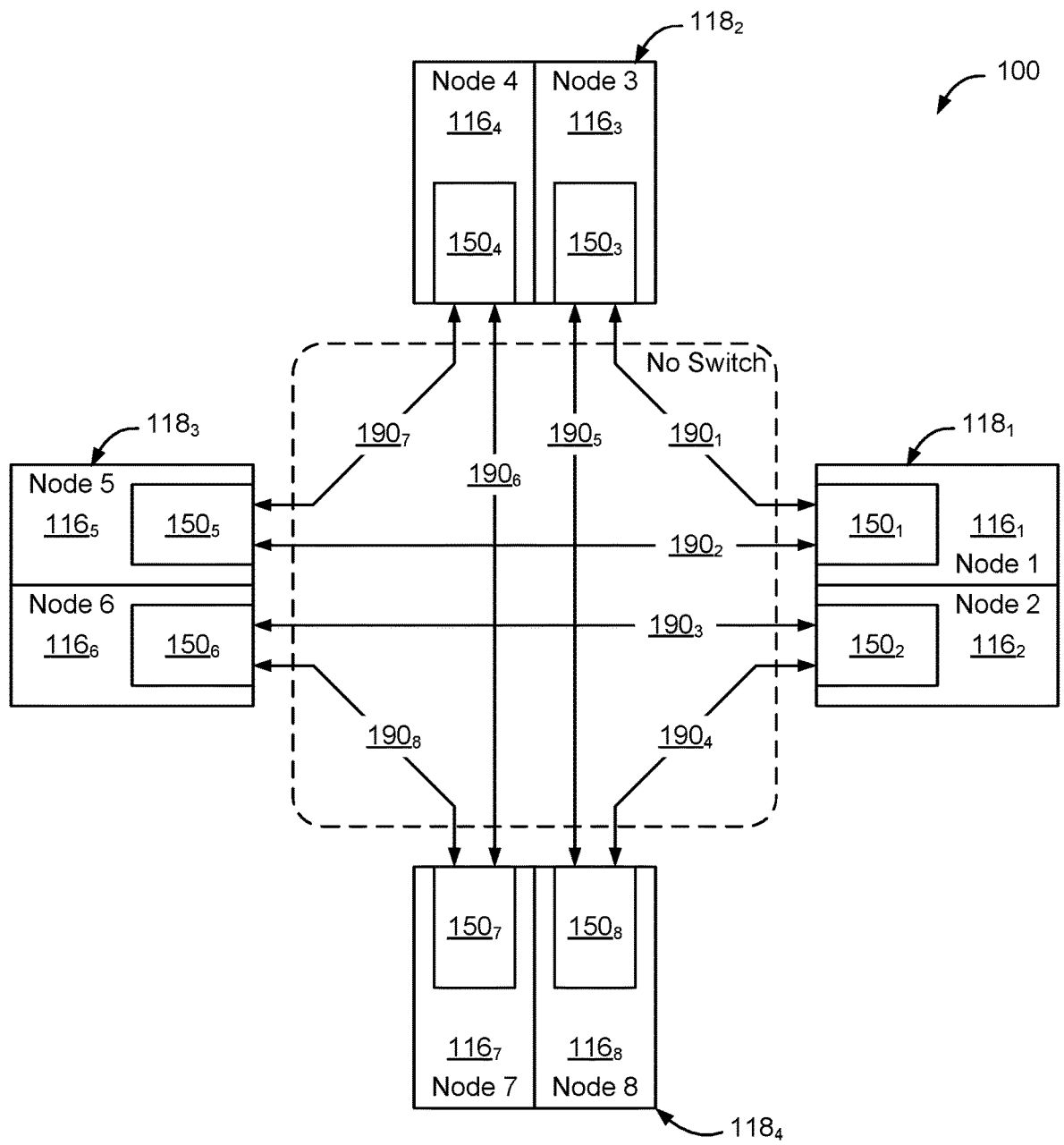
FIG. 6 is a functional block diagram of a storage system having four directly connected storage engines, each storage engine having dual compute nodes, and in which eight point-to-point connections are used to interconnect pairs of compute nodes on different storage engines, such that each compute node is connected to exactly two other compute nodes of the storage system.

FIG. 6 shows an interconnected set of storage engines 118, using direct point-to-point links, without using an external switch to interconnect the fabric access modules of the storage engines 118. Each of the fabric access modules 150, in some embodiments, is implemented as shown in FIG. 5 to include both a multi-initiator module 182, a pair of PCIe interfaces $180_1$, $180_2$, a chaining fabric 183, and a pair of fabric access ports $184_1$, $184_2$.

In the implementation shown in FIG. 6, the storage system 100 includes four storage engines $118_1$, $118_2$, $118_3$, $118_4$, interconnected by eight point-to-point connections $190_1$, $190_2$, $190_3$, $190_4$, $190_5$, $190_6$, $190_7$, $190_8$. The point-to-point connections are used to interconnect pairs of compute nodes on different storage engines, such that each compute node is connected to exactly two other compute nodes of the storage system. Although some embodiments will be described in which the storage system includes four storage engines with eight total compute nodes, other numbers of storage engines 118 may be used as well, depending on the implementation.

As shown in FIG. 6, in some embodiments no switch is used intermediate the storage engines 118. For example, in an embodiment in which the links 190 are implemented using InfiniBand busses, no InfiniBand switch is interposed between the storage engines 118, which reduces the cost of implementing the storage system 100 and, since the switch does not need to be powered, reduces the overall energy usage of the storage system 100.

FIGS. 7-14 are functional block diagram of the storage system of FIG. 6, showing atomic operations on compute node $116_1$ through compute node $116_1$'s host adapter $150_1$ by all other compute nodes of the storage system. As shown in FIGS. 7-14, a path exists from every node to compute node $116_1$ that passes through compute node $116_1$'s host adapter $150_1$. In some embodiments, all atomic operations normally target the native host adapter on each compute node. Thus, atomic operations on compute node $116_1$ preferably are implemented through $116_1$'s host adapter $150_1$, atomic operations on compute node $116_2$ preferably are implemented through $116_2$'s host adapter $150_2$, etc. Targeting the compute node's host adapter facilitates proper atomic consistency when a node's adapter fails.

Figure 7:
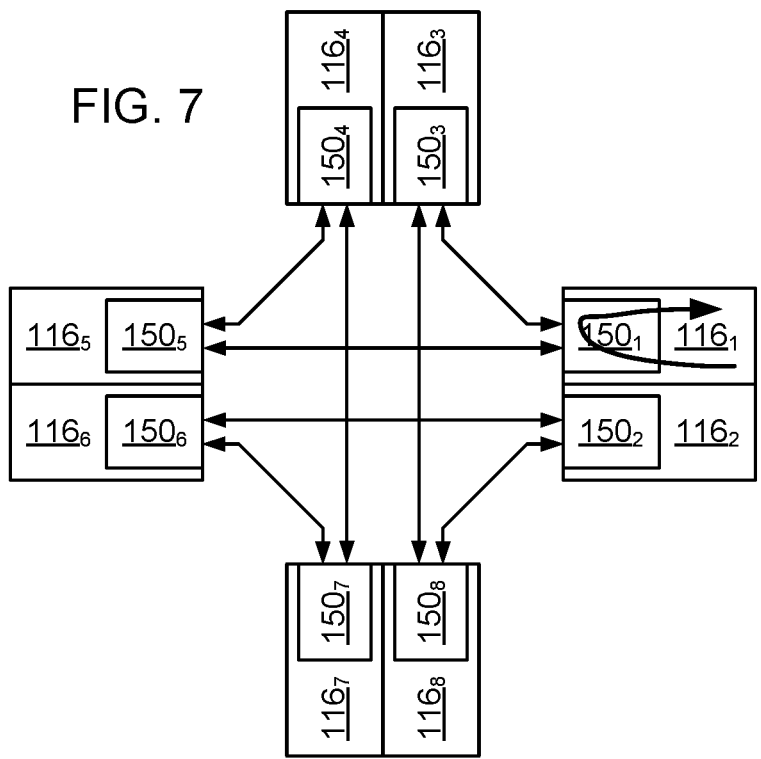
FIGS. 7-14 are functional block diagram of the storage system of FIG. 6, showing atomic operations on compute node 1 by other compute nodes of the storage system.

FIG. 7 shows a local atomic operation by compute node $116_1$ on its own memory $124_1$. Specifically, in some implementations all atomic operations are managed by the compute node's host adapter 150. According, to implement a local atomic operation, the CPU $122_1$ issues the atomic operation to host adapter $150_1$. Host adapter $150_1$ loops the request to itself, asking itself to perform the atomic operation and return the results. Host adapter $150_1$ performs the atomic operation on memory $124_1$ and returns the result of the atomic operation through itself to memory $124_1$ and notifies CPU $122_1$.

Figure 8:
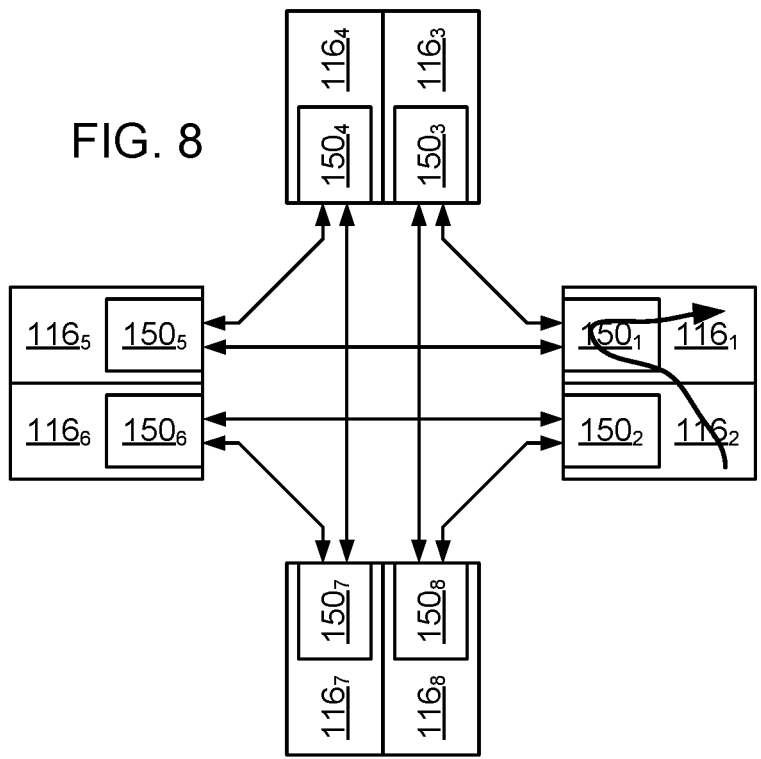

FIG. 8 shows an atomic operation by compute node $116_2$ on the memory $124_1$ of compute node $116_1$ through compute node $116_1$'s host adapter $150_1$. As noted above, since compute node $116_2$ and compute node $116_1$ are contained in the same storage engine $118_1$, and both host adapters $150_1$, $150_2$ are interconnected to both compute nodes $116_1$, $116_1$, compute node $116_2$ can perform an atomic operation on memory $124_1$ of compute node $116_1$ internally within storage engine $118_1$ through compute node $116_1$'s host adapter $150_1$.

Figure 9:
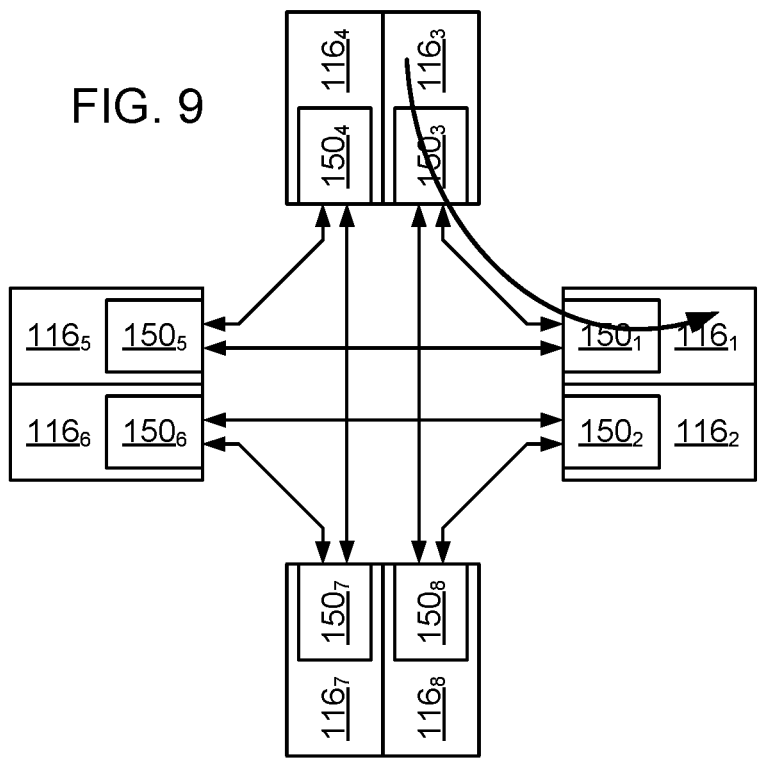

FIG. 9 shows an atomic operation by compute node $116_3$ on the memory $124_1$ of compute node $116_1$ through compute node $116_1$'s host adapter $150_1$. As shown in FIG. 9, compute node $116_3$ issues the atomic operation to its host adapter $150_3$, which passes the atomic operation on link $190_1$ to host adapter $150_1$. Host adapter $150_1$ implements the atomic operation and returns the result along the reverse path.

Figure 10:
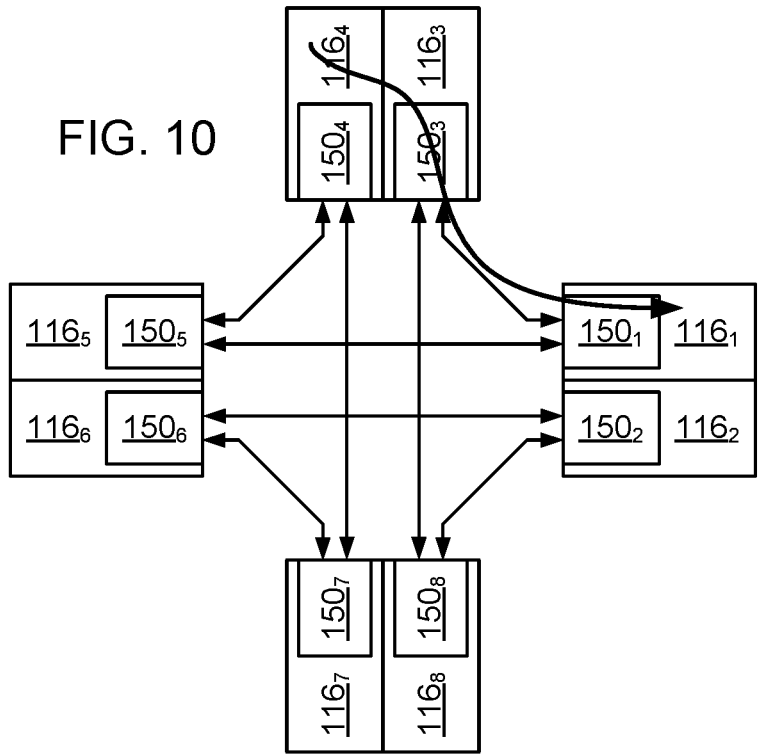

FIG. 10 shows an atomic operation by compute node $116_4$ on the memory $124_1$ of compute node $116_1$ through compute node $116_1$'s host adapter $150_1$. As shown in FIG. 10, compute node $116_4$'s host adapter is not connected by an external link to compute node $116_1$. However, compute node $116_4$ is connected within storage engine $118_2$ to host adapter $150_3$, which is connected by link $190_1$ to compute node $116_1$. Accordingly, compute node $116_4$ issues the atomic operation on compute node $116_3$'s host adapter $150_3$, which passes the atomic operation on link $190_1$ to host adapter $150_1$. Host adapter $150_1$ implements the atomic operation and returns the result along the reverse path.

Figure 11:
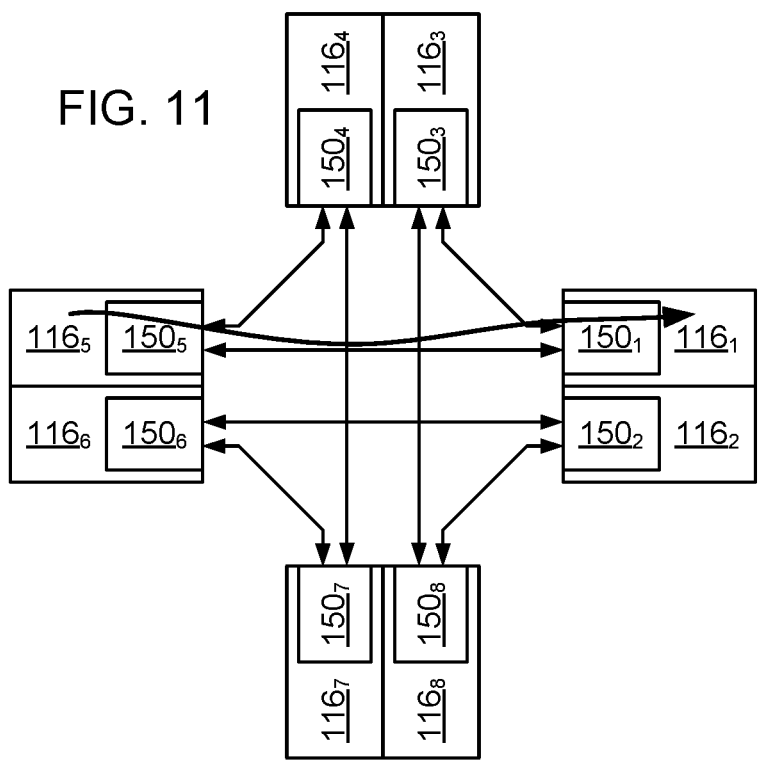

FIG. 11 shows an atomic operation by compute node $116_5$ on the memory $124_1$ of compute node $116_1$ through compute node $116_1$'s host adapter $150_1$. As shown in FIG. 11, compute node $116_5$ is connected by link $190_2$ to compute node $116_1$. Accordingly, compute node $116_5$ issues the atomic operation on its host adapter $150_5$, which passes the atomic operation on link $190_2$ to host adapter $150_1$. Host adapter $150_1$ implements the atomic operation and returns the result along the reverse path.

Figure 12:
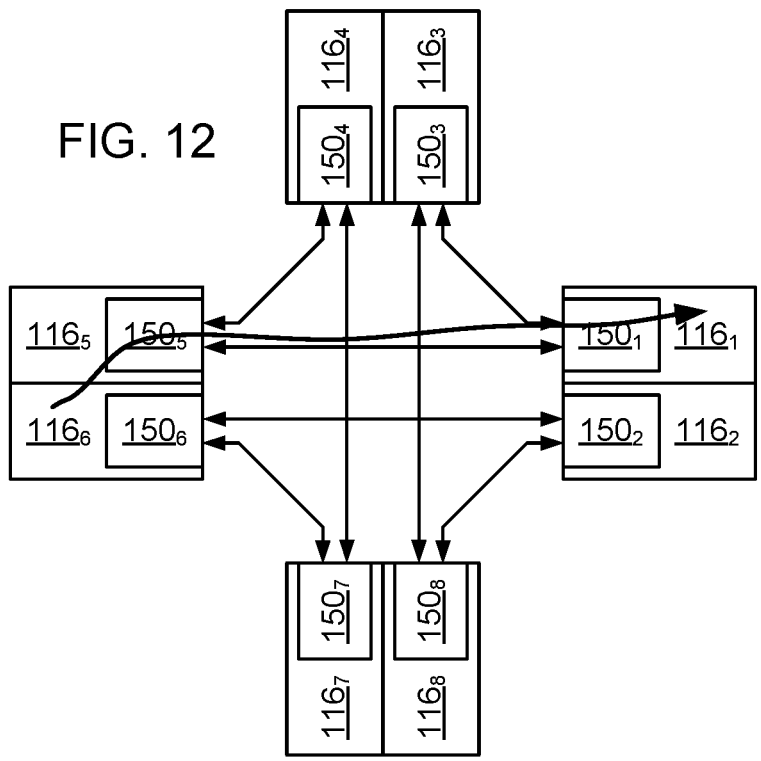

FIG. 12 shows an atomic operation by compute node $116_6$ on the memory $124_1$ of compute node $116_1$ through compute node $116_1$'s host adapter $150_1$. As shown in FIG. 12, compute node $116_6$'s host adapter is not connected by an external link to compute node $116_1$. However, compute node $116_6$ is connected within storage engine $118_3$ to host adapter $150_5$, which is connected by link $190_2$ to compute node $116_1$. Accordingly, compute node $116_4$ issues the atomic operation on compute node $116_5$'s host adapter $150_5$, which passes the atomic operation on link $190_2$ to host adapter $150_1$. Host adapter $150_1$ implements the atomic operation and returns the result along the reverse path.

Figure 13:
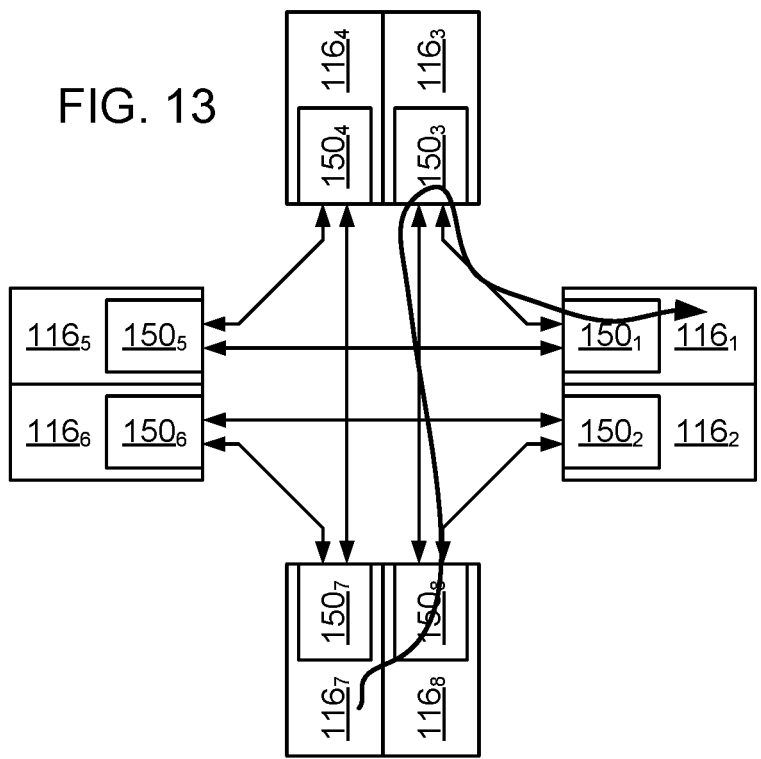

FIG. 13 shows an atomic operation by compute node $116_7$ on the memory $124_1$ of compute node $116_1$ through compute node $116_1$'s host adapter $150_1$. As shown in FIG. 13, neither the host adapter $150_7$ of compute node $116_7$ nor the host adapter $150_8$ of compute node $116_8$ are connected by an external link directly to compute node $116_1$. However, compute node $116_8$ is connected by link $190_5$ to compute node $116_3$, which is connected by link $190_1$ to compute node $116_1$. This represents a two-hop path between compute node $116_7$ and compute node $116_1$. Accordingly, compute node $116_7$ issues the atomic operation on compute node $116_8$'s host adapter $150_8$, which passes the atomic operation on link $190_5$ to compute node $116_3$'s host adapter $150_3$. The fabric chaining module $183_3$ of compute node $116_3$'s host adapter $150_3$ loops the request from a first fabric access port $184_1$ to a second fabric access port $184_2$ to redirect the request on link $190_1$ to compute node $116_1$. Host adapter $150_1$ implements the atomic operation and returns the result along the reverse path.

Figure 14:
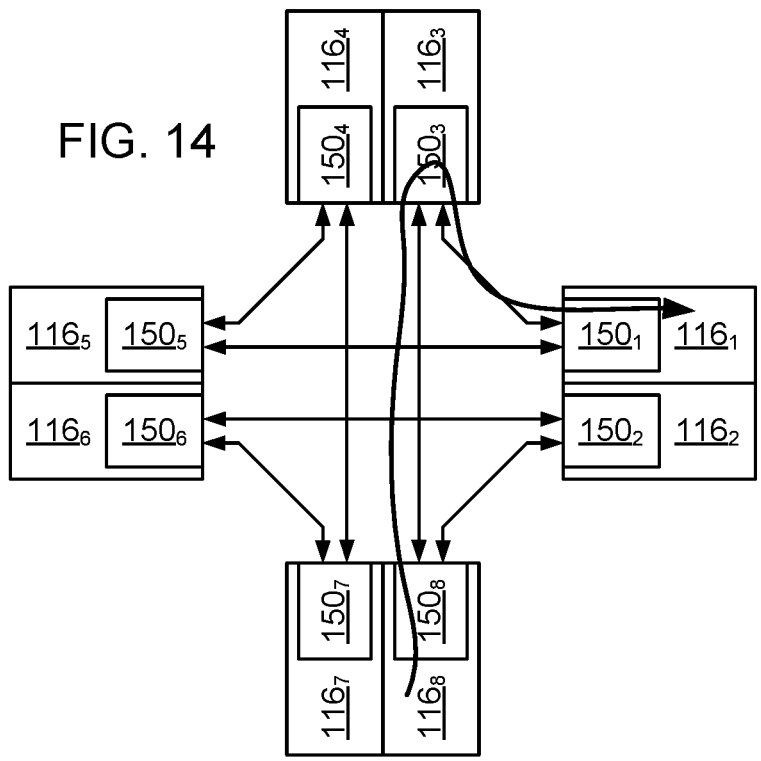

FIG. 14 shows an atomic operation by compute node $116_8$ on the memory $124_1$ of compute node $116_1$ through compute node $116_1$'s host adapter $150_1$. FIG. 14 is the same as FIG. 13, with the exception that compute node $116_8$ issues the atomic operation on its own host adapter $150_8$ rather than having compute node $116_7$ issue the atomic operation.

As shown in FIGS. 7-14, a path exists from every compute node $116_1$-$116_8$ to compute node $116_1$ that passes through compute node $116_1$'s host adapter $150_1$. The path for compute nodes $116_1$ and $116_2$ require zero external link hops. Compute nodes $116_3$, $116_4$, $116_5$ and $116_6$ each require one external link hop. Compute nodes $116_7$ and $116_8$ each require two external link hops. On average, in this configuration, all compute nodes have an average of one external link hop to the memory of every other compute node in the storage system 100. Further, atomic operations from all compute nodes to a given compute node can pass through that node's host adapter, guaranteeing proper atomic consistence. Data movement operations can likewise leverage the same paths, such that the average balance of link usage is one hop for data movements, assuming even distribution of bandwidth loading.

FIGS. 15-18 are functional block diagram of the storage system of FIG. 6, showing atomic operations on compute node $116_1$ through compute node $116_1$'s host adapter $150_1$, by other compute nodes of the storage system, in connection with a failure of compute node $116_3$'s host adapter $150_3$.

Figure 15:
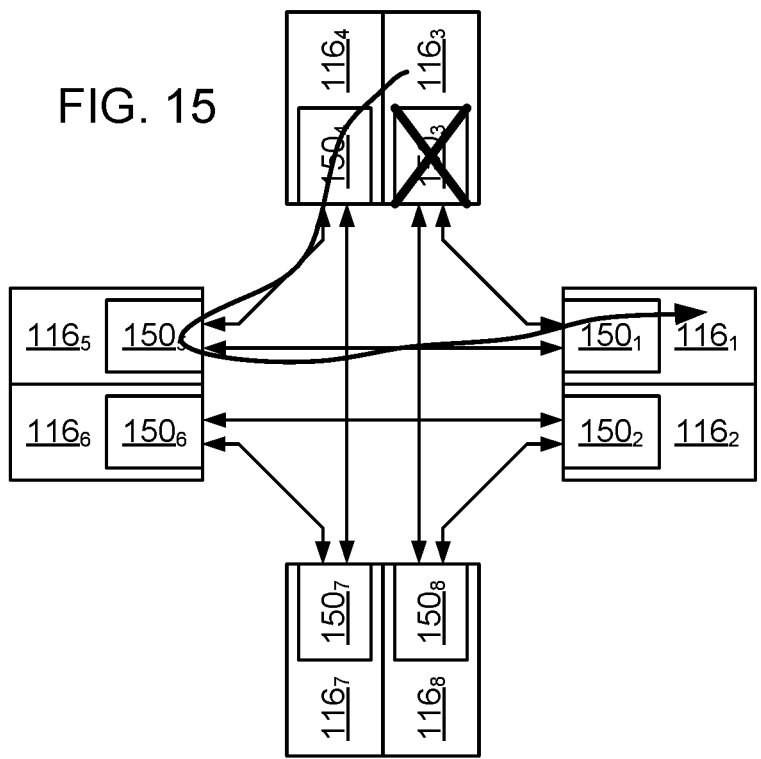
FIGS. 15-18 are functional block diagram of the storage system of FIG. 6, showing atomic operations on compute node 1 by other compute nodes of the storage system in connection with a failure of compute node 3's host adapter.
Figure 16:
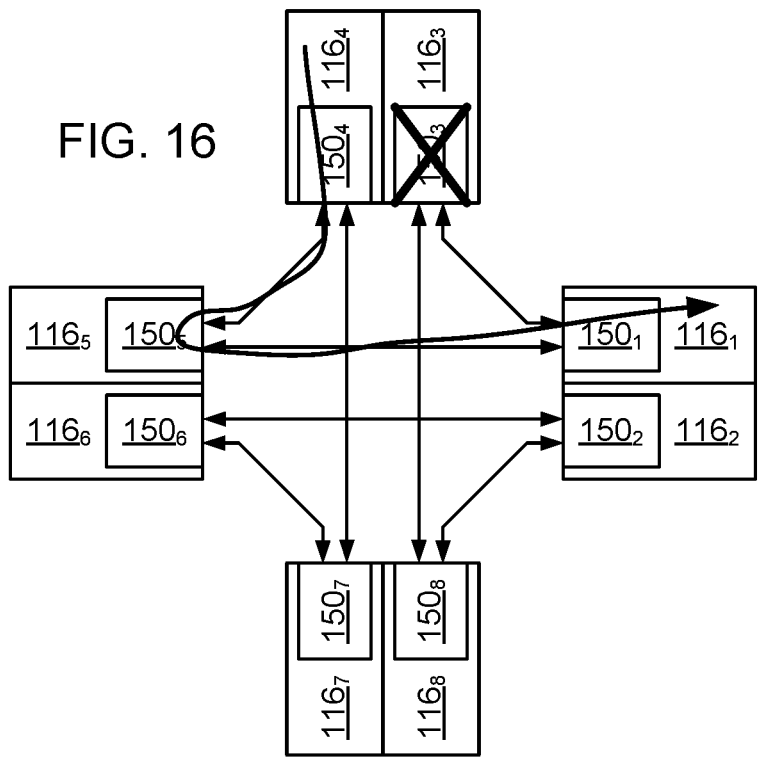

As shown in FIG. 15, if compute node $116_3$'s host adapter $150_3$ is down, compute node $116_3$ can still issue atomic operations through compute node $116_4$'s host adapter $150_4$. Since compute node $116_4$ has a one hop path to compute node $116_1$ (thorough compute node $116_5$), compute node $116_3$ has a two-hop path to compute node 1 in the event of a failure of compute node $116_3$'s host adapter $150_3$. FIG. 16 similarly shows that compute node $116_4$ has a two-hop path to compute node $116_1$ (thorough compute node $116_5$) in the event of a failure of compute node $116_3$'s host adapter $150_3$.

Figure 17:
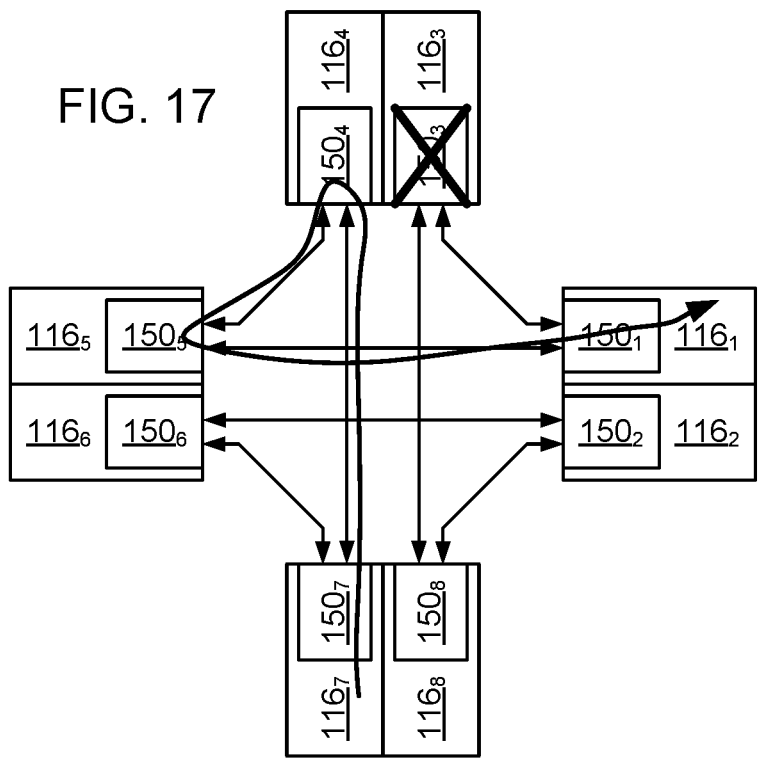
Figure 18:
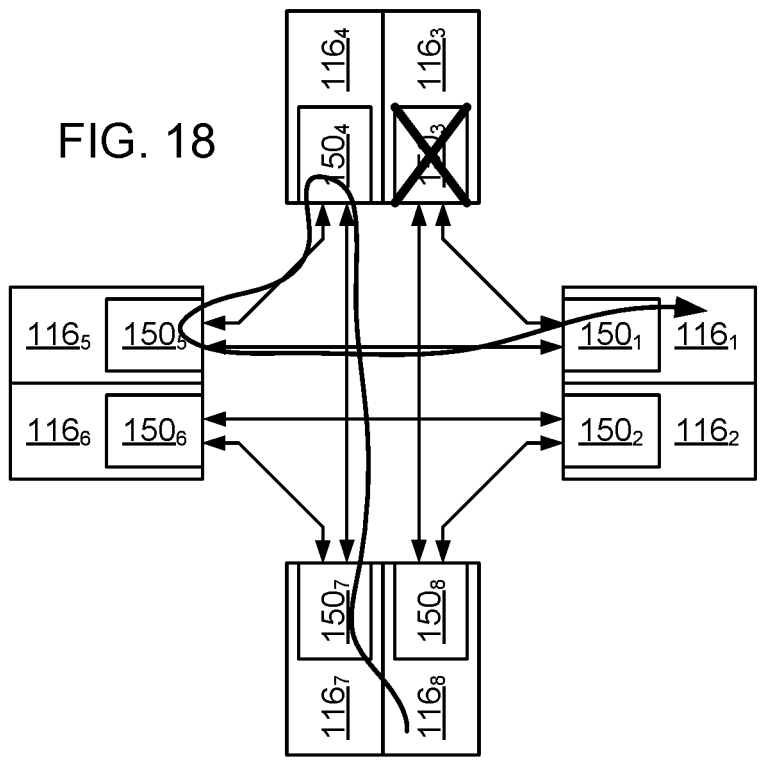

The other nodes that relied on compute node $116_3$'s host adapter $150_3$ were nodes $116_7$ and $116_8$ (See preceding discussion regarding FIGS. 13-14). Accordingly, in the event of a failure of host adapter $150_3$, nodes $116_7$ and $116_8$ will need to find a new path to compute node $116_1$. As shown in FIGS. 17 and 18, compute node $116_7$ (FIG. 17) and compute node $116_8$ (FIG. 18) have three hop paths to compute node $116_1$ through node $116_4$ and node $116_5$. Accordingly, in the event of a single failure of one compute node's host adapter, all of the other compute nodes 116 in the storage system 100 continue to have access to implement atomic operations on all of the other compute nodes 116.

FIGS. 19-22 are functional block diagram of the storage system of FIG. 6, showing atomic operations by compute node $116_3$ on other compute nodes of the storage system in connection with a failure of compute node $116_3$'s own host adapter $150_3$. As shown in FIGS. 19-22, compute node $116_3$ continues to have access to implement atomic operations on all of the other compute nodes 116 through compute node $116_4$'s host adapter $150_4$.

Figure 19:
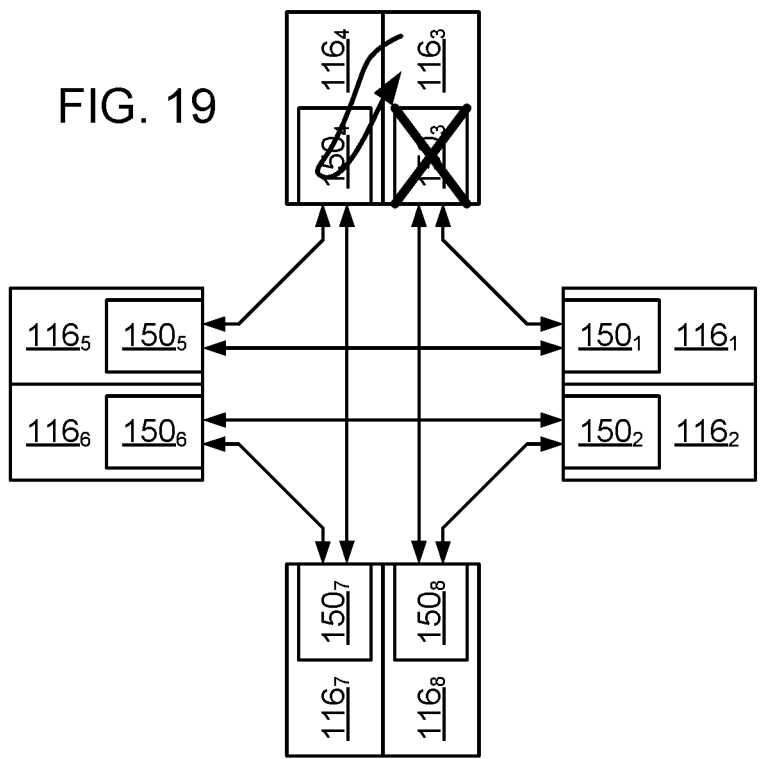
FIGS. 19-22 are functional block diagram of the storage system of FIG. 6, showing atomic operations by compute node 3 on other compute node of the storage system in connection with a failure of compute node 3's host adapter.

In particular, as shown in FIG. 19, compute node $116_3$ can implement atomic operations on its own memory via host adapter $150_4$. As noted above, all compute nodes normally target the native host adapter. However, since compute node $116_3$'s native host adapter $150_3$ is down, compute node $116_3$ will break this general rule and use host adapter $150_4$ to implement atomic operations on its own memory.

Figure 20:
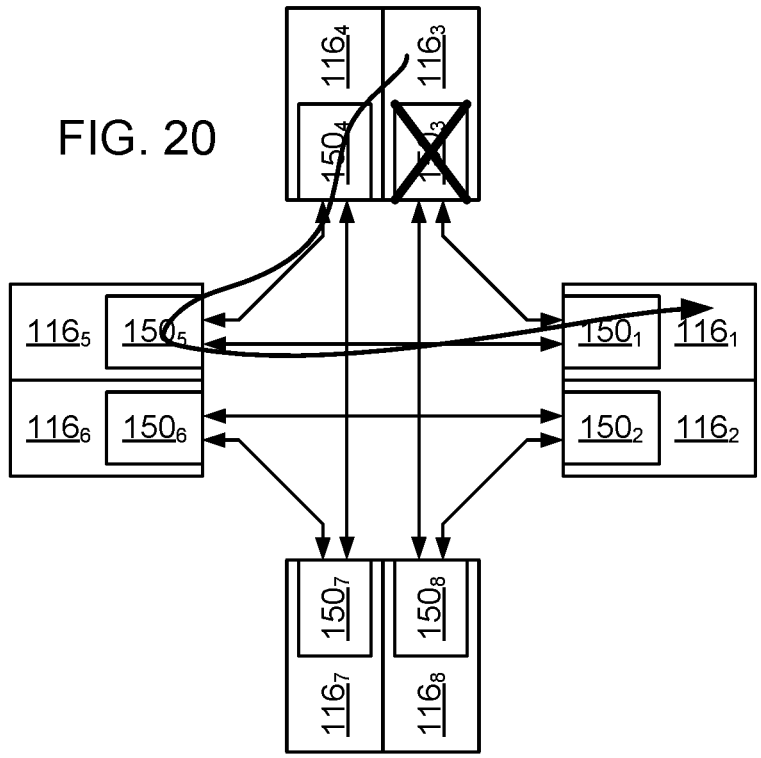

FIG. 20 shows one possible way for compute node $116_3$ to issue an atomic operation on compute node $116_1$. There are other paths that compute node $116_3$ could take to reach compute node $116_1$. The path shown in FIG. 20 results in two external link hops. In particular, as shown in FIG. 20, compute node $116_3$ can issue atomic operations to compute node $116_1$ via host adapter $150_4$, which is passed on link $190_7$ to compute node $116_5$, and looped by compute node $116_5$ on link $190_2$ to compute node $116_1$.

Figure 21:
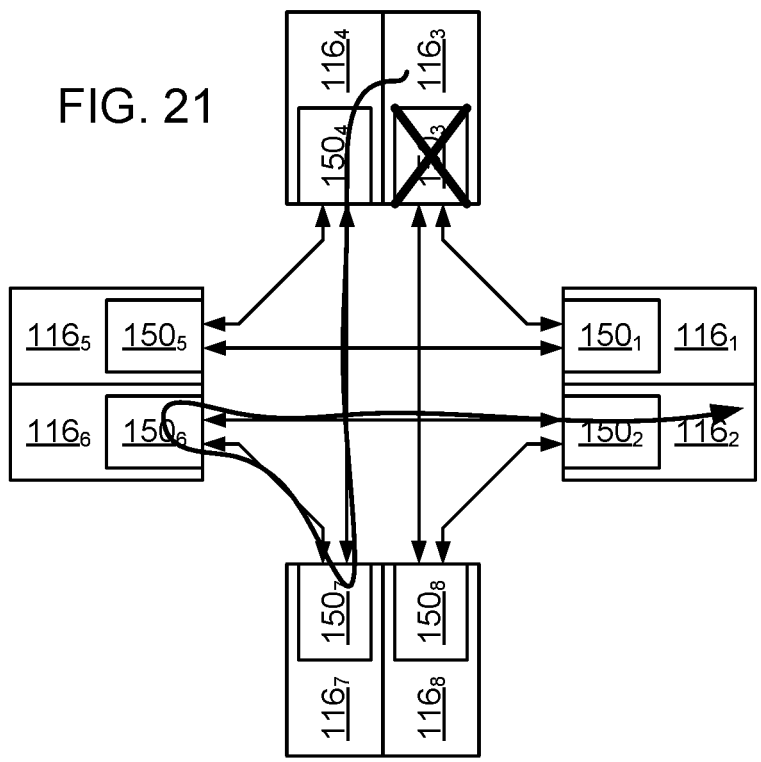

FIG. 21 shows one possible way for compute node $116_3$ to issue an atomic operation on compute node $116_2$. There are other paths that compute node $116_3$ could take to reach compute node $116_1$. The path shown in FIG. 21 results in three external hops. In particular, as shown in FIG. 21, compute node $116_3$ can issue atomic operations to compute node $116_2$ via host adapter $150_4$, which is passed on link $190_6$ to compute node $116_7$, looped by compute node $116_7$ on link $190_8$ to compute node $116_6$, and looped by compute node $116_6$ on link $190_3$ to compute node $116_2$.

Figure 22:
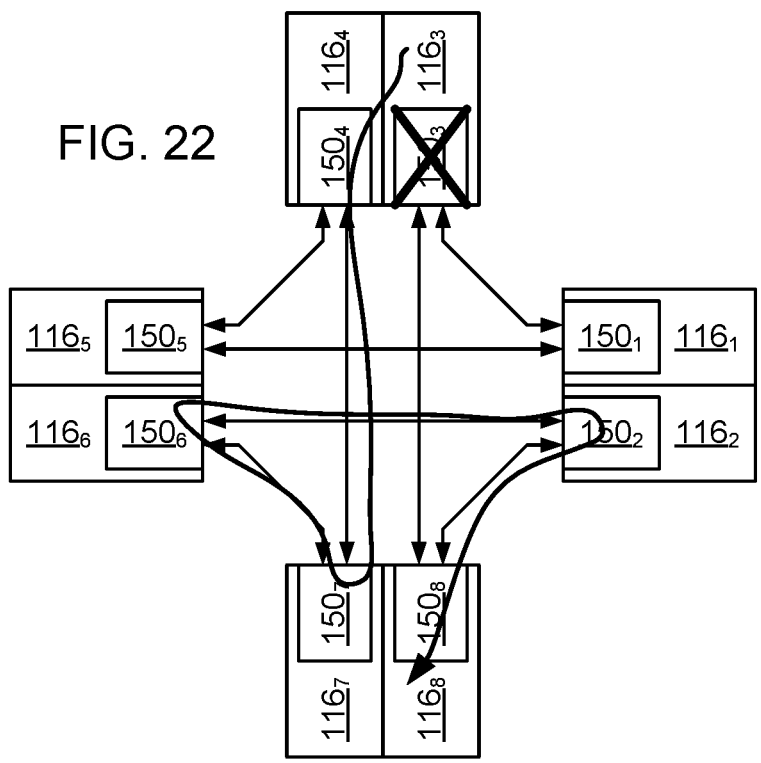

FIG. 22 shows one possible way for compute node $116_3$ to issue an atomic operation on compute node $116_8$. There are other paths that compute node $116_3$ could take to reach compute node $116_8$. The path shown in FIG. 22 results in four external hops. In particular, as shown in FIG. 22, compute node $116_3$ can issue atomic operations to compute node $116_8$ via host adapter $150_4$. Host adapter $150_4$ sends the atomic operations on link $190_6$ to compute node $116_7$. Compute node $116_7$ forwards the atomic operation on link $190_8$ to compute node $116_6$. Compute node $116_6$ forwards the atomic operation on link $190_3$ to compute node $116_2$. Compute node $116_2$ forwards the atomic operation on link $190_4$ to compute node $116_8$. Although this sequence requires four external hops, as shown in FIGS. 19-22, compute node $116_3$ is able to implement atomic operations on each other compute node 116 through that compute node's native host adapter even in the event of a failure of compute node $116_3$'s host adapter $150_3$.

FIGS. 23-30 are functional block diagram of the storage system of FIG. 6, showing atomic operations on compute node $116_2$ by other compute nodes of the storage system 100 in connection with a failure of compute node $116_2$'s host adapter $150_2$.

As shown in FIGS. 23-30, each node has a path to compute node $116_2$ through compute node $116_1$'s host adapter $150_1$. Although, as noted above, atomic operations normally target the native host adapter 150 associated with a particular compute node, in the event of a failure of the compute node's host adapter, the other host adapter in the storage engine 118 is targeted and used to obtain access to the compute node with the failed host adapter.

Figure 23:
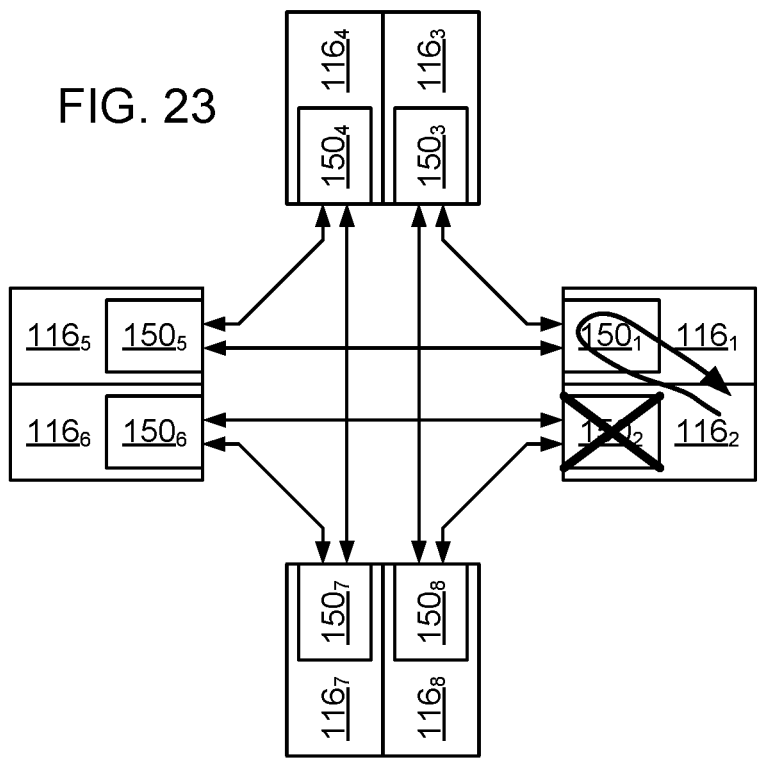
FIGS. 23-30 are functional block diagram of the storage system of FIG. 6, showing atomic operations on compute node 2 by other compute nodes of the storage system in connection with a failure of compute node 2's host adapter.
Figure 24:
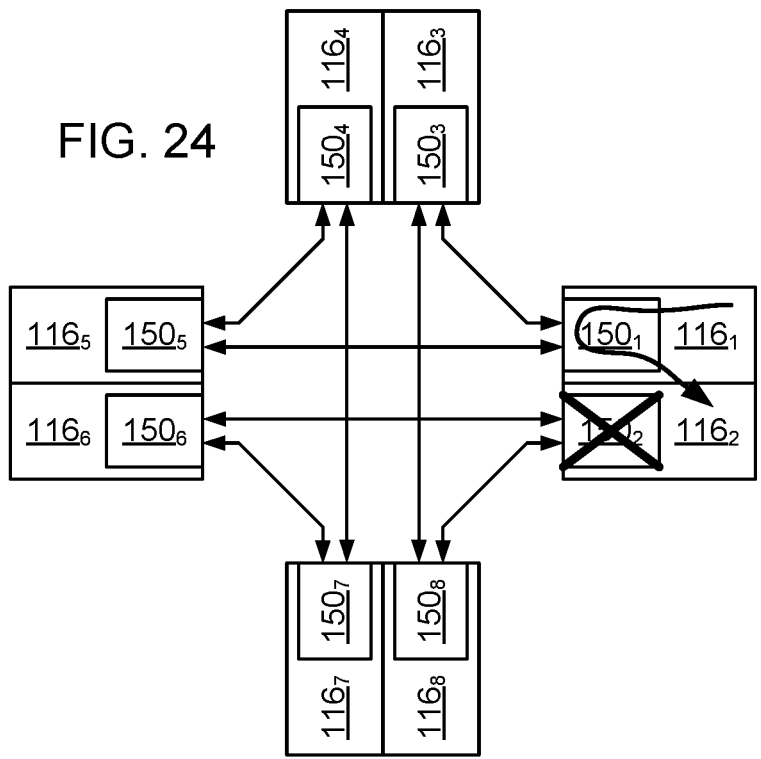

Accordingly, FIG. 23 shows implementation of an atomic operation by node $116_2$ on itself through node $116_1$'s host adapter $150_1$. FIG. 24 shows implementation of an atomic operation by node $116_1$ on through node $116_1$'s host adapter $150_1$.

Figure 25:
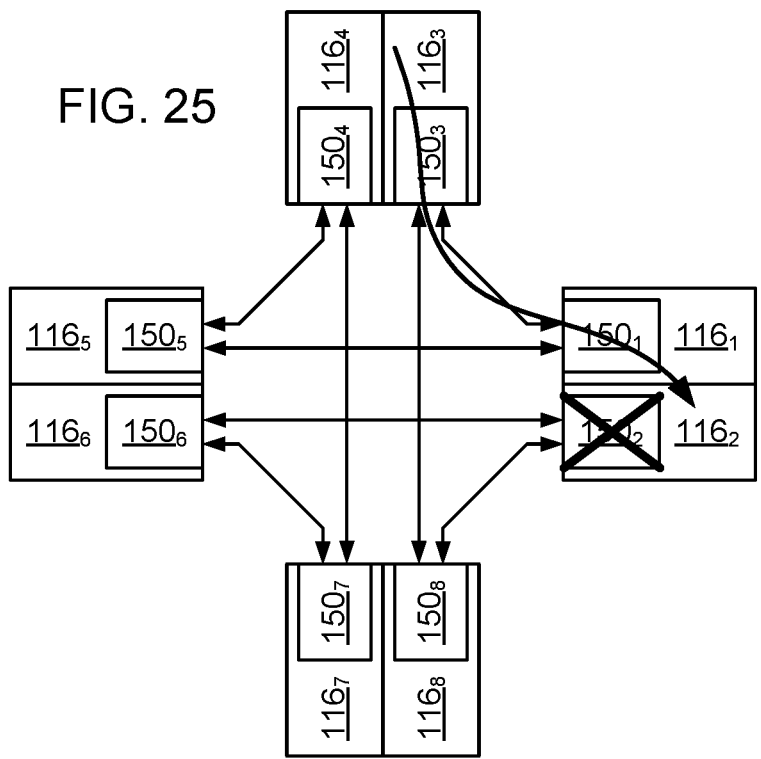
Figure 26:
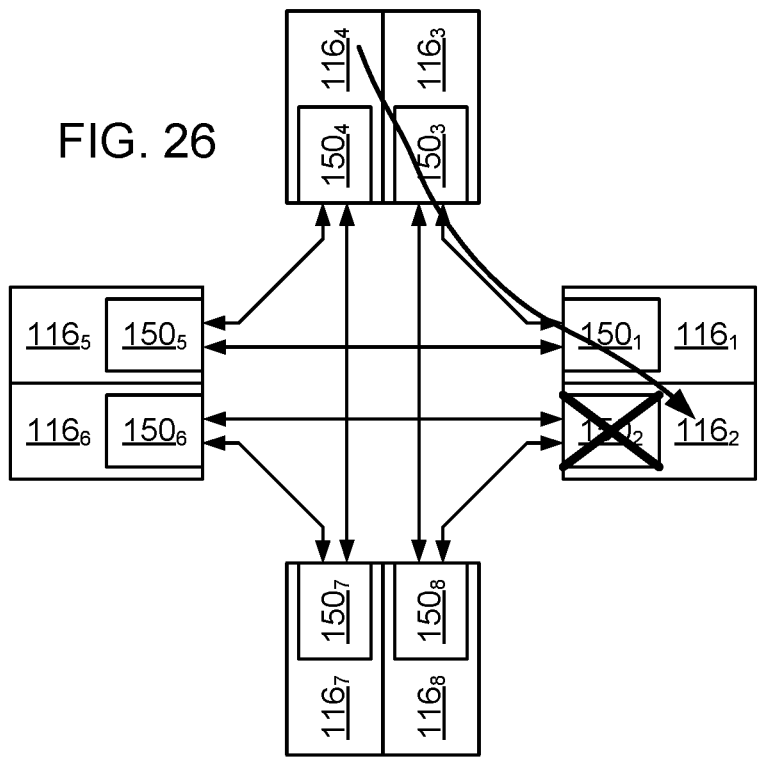

As shown in FIGS. 25 and 26, compute nodes $116_3$ and $116_4$ are able to implement atomic operations on node $116_2$ through node $116_3$'s host adapter $150_3$, link $190_1$, and compute node $116_1$'s host adapter $150_1$.

Figure 27:
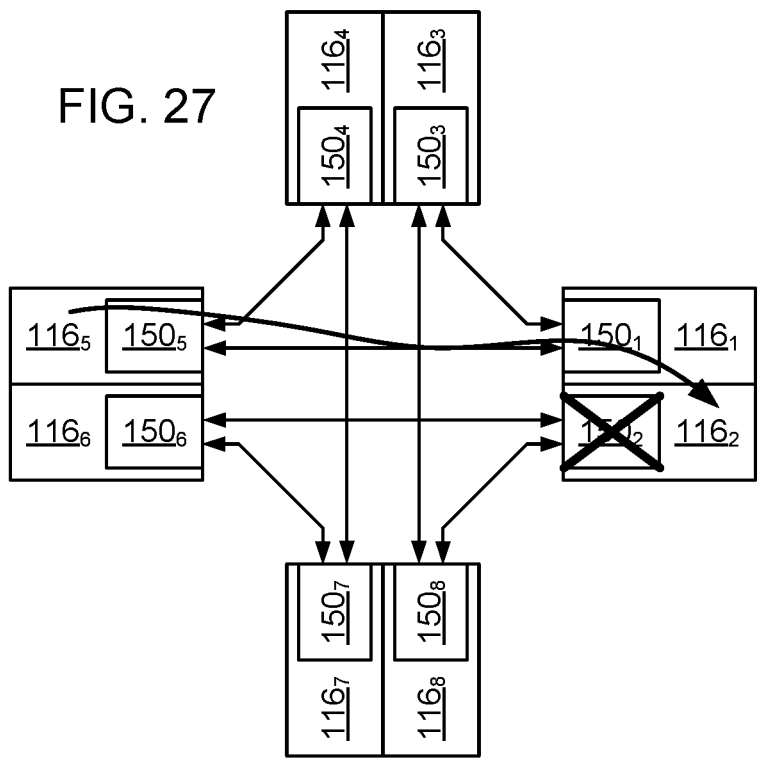
Figure 28:
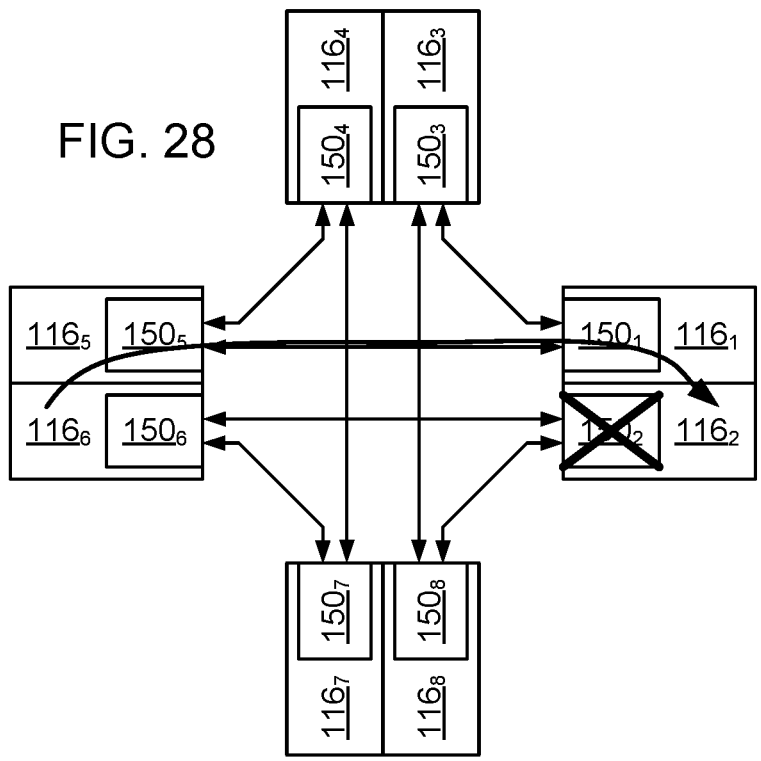

As shown in FIGS. 27 and 28, compute nodes $116_5$ and $116_6$ are able to implement atomic operations on node $116_2$ through node $116_5$'s host adapter $150_5$, link $190_2$, and compute node $116_1$'s host adapter $150_1$.

Figure 29:
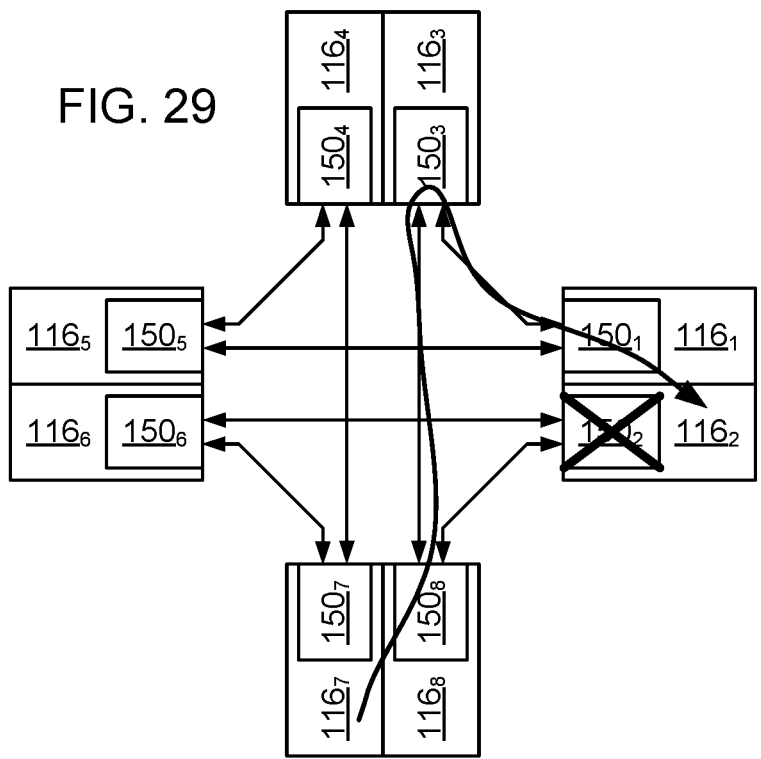
Figure 30:
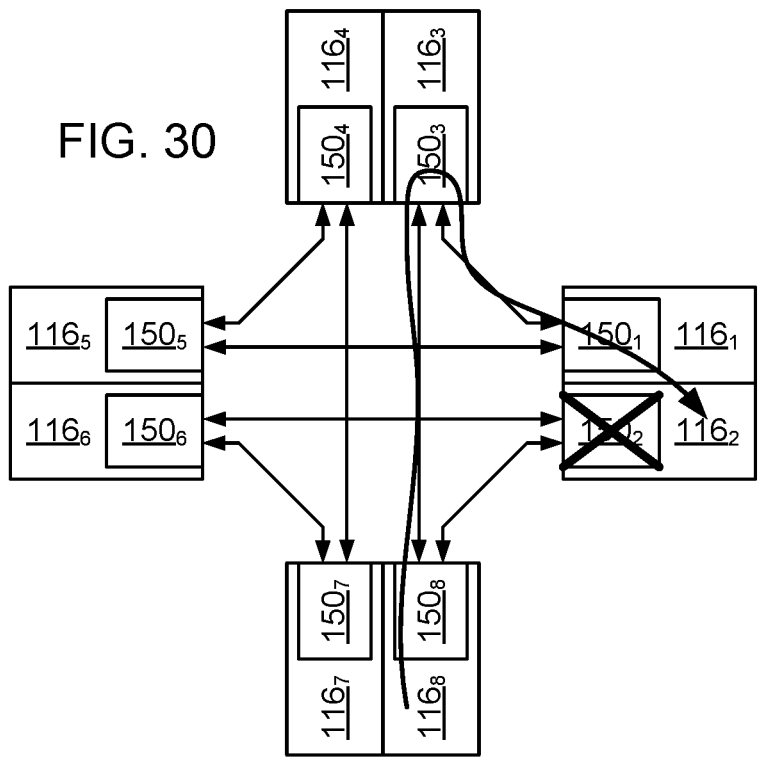

As shown in FIGS. 29 and 30, compute nodes $116_7$ and $116_8$ are able to implement atomic operations on node $116_2$ through node $116_8$'s host adapter $150_8$ which are passed on link $190_5$, to compute node $116_3$. Compute node $116_3$ forwards the atomic operations on link $190_1$ to compute node $116_1$'s host adapter $150_1$, which implements the atomic operation on compute node $116_2$.

Accordingly, atomic operations from all nodes targeted to a given node can get to the node's host adapter, guaranteeing proper atomic consistency when any other node's host adapter fails. When a compute node's host adapter fails, atomic operations from that node to any other node can be accomplished by exiting through the other host adapter in the storage engine. Atomic operations to the compute node with the failed host adapter can be accomplished by arriving through the other host adapter in the storage engine. In these failure scenarios, performance balance and net performance is not assured, but correct function can be maintained.

The methods described herein may be implemented as software configured to be executed in control logic such as contained in a Central Processing Unit (CPU) or Graphics Processing Unit (GPU) of an electronic device such as a computer. In particular, the functions described herein may be implemented as sets of program instructions stored on a non-transitory tangible computer readable storage medium. The program instructions may be implemented utilizing programming techniques known to those of ordinary skill in the art. Program instructions may be stored in a computer readable memory within the computer or loaded onto the computer and executed on computer's microprocessor. However, it will be apparent to a skilled artisan that all logic described herein can be embodied using discrete components, integrated circuitry, programmable logic used in conjunction with a programmable logic device such as a Field Programmable Gate Array (FPGA) or microprocessor, or any other device including any combination thereof. Programmable logic can be fixed temporarily or permanently in a tangible computer readable medium such as random-access memory, a computer memory, a disk, or other storage medium. All such embodiments are intended to fall within the scope of the present invention.

Throughout the entirety of the present disclosure, use of the articles "a" or "an" to modify a noun may be understood to be used for convenience and to include one, or more than one of the modified noun, unless otherwise specifically stated.

Elements, components, modules, and/or parts thereof that are described and/or otherwise portrayed through the figures to communicate with, be associated with, and/or be based on, something else, may be understood to so communicate, be associated with, and or be based on in a direct and/or indirect manner, unless otherwise stipulated herein.

Various changes and modifications of the embodiments shown in the drawings and described in the specification may be made within the spirit and scope of the present invention. Accordingly, it is intended that all matter contained in the above description and shown in the accompanying drawings be interpreted in an illustrative and not in a limiting sense. The invention is limited only as defined in the following claims and the equivalents thereto.

What is claimed is:

1. A storage system, comprising:
a storage engine having a first compute node, a second compute node, a first fabric adapter, and a second fabric adapter, the first compute node having a first memory and the second compute node having a second memory;
a first internal connection between the first compute node and the first fabric adapter;
a second internal connection between the first compute node and the second fabric adapter;
a third internal connection between the second compute node and the first fabric adapter; and
a fourth internal connection between the second compute node and the second fabric adapter;
wherein the first fabric adapter contains a first multi-initiating module configured to enable both the first compute node and the second compute node to directly initiate atomic memory access operations on the first memory through the first fabric adapter, and contains a first fabric chaining module configured to enable memory access operations received on a first external connection to be re-transmitted out a second external connection; and
wherein the second fabric adapter contains a second multi-initiating module configured to enable both the second compute node and the first compute node to directly initiate atomic memory access operations on the second memory through the second fabric adapter, and contains a second fabric chaining module configured to enable memory access operations received on a third external connection to be re-transmitted out a fourth external connection.

2. A storage engine, comprising:
a first compute node with an associated first fabric access module, the first fabric access module including a first host adapter, a first multi-initiating module, and a first fabric chaining module;
a second compute node with an associated second fabric access module, the second fabric access module including a second host adapter, a second multi-initiating module, and a second fabric chaining module; and
an interconnection system interconnecting the first compute node with the first fabric access module and with the second fabric access module, and interconnecting the second compute node with the second fabric access module and with the first fabric access module;
wherein each fabric chaining module is connected to two external fabric access ports and configured to forward a first subset of memory operations received on a first of the two external fabric access ports out the second of the two external fabric access ports; and
wherein the storage engine is implemented using a single physical enclosure.

3. The storage engine of claim 2, wherein each fabric chaining module is further configured to forward a second subset of memory operations received on a first of the two external fabric access ports to the first compute node on the interconnection system.

4. A storage system, comprising:
four storage engines, each storage engine including two compute nodes; and
eight point-to-point connections, each point-to-point connection interconnecting pairs of compute nodes on different storage engines, such that each compute node is connected to exactly two other compute nodes of the storage system.

5. The storage system of claim 4, wherein each compute node has a respective fabric access module including a host adapter, a multi-initiating module, and a fabric chaining module.

6. The storage system of claim 5, wherein each storage engine comprises an internal interconnection system connecting each of the two compute nodes with both of the respective fabric access modules.

7. The storage system of claim 6, wherein each compute node has a respective memory, and the respective host adapter of each compute node is configured to implement atomic operations on the respective memory of its compute node.

8. The storage system of claim 6, wherein the multi-initiating module is configured to enable atomic operations to be initiated by either compute node on a memory of the other compute node.

9. The storage system of claim 7, wherein the multi-initiating module of a first compute node of one of the storage engines is configured to enable atomic operations to be initiated on the memory of a second compute node of the one of the storage engines, only upon failure of a respective fabric access module of the first compute node.

10. The storage system of claim 5, wherein each fabric access module is connected to two of the point-to-point connections.

11. The storage system of claim 10, wherein each fabric chaining module is configured to enable an atomic operation received on one of the point-to-point connections to be redirected out onto the other of the point-to-point connections.

* * * * *